INVENTOR
ALBERT H. MOOS

United States Patent Office 3,520,562
Patented July 14, 1970

3,520,562
HOSE FITTING AND CONNECTION
Albert H. Moos, Indianapolis, Ind., assignor to Ransburg Electro-Coating Corp., Indianapolis, Ind., a corporation of Indiana
Filed Sept. 15, 1967, Ser. No. 668,149
Int. Cl. F16l 33/00
U.S. Cl. 285—39                                 9 Claims

ABSTRACT OF THE DISCLOSURE

A hose fitting capable of withstanding high pressure for an electrostatic coating system includes a metallic inner member forming a passageway of fluids at high pressure and an outer sleeve of insulating material having serrations at one end. Upon assembly of the hose fitting to the hose the inner member forces the hose into the serrations of the outer sleeve providing a seal between the hose fitting and the hose and retaining the fitting on the hose. The inner member includes a straight threaded connector portion projecting from the fitting upon assembly and carrying a resilient seal. When the fitting is connected to the fitting receptacle, the resilient seal is supported between the fitting and fitting receptacle and seals the connection.

---

This invention relates to a hose fitting capable of withstanding high pressure and more particularly to a hose fitting which upon assembly has an outer surface of insulating material.

In electrostatic spray coating systems it is frequently desirable to employ spray guns which utilize high hydrostatic pressure to effect atomization of the coating material by forcing the coating material through a small orifice designed to form the coating material into a thin expanding film. Such systems are described in U.S. Pat. 3,169,883.

It is desirable in such systems that ionization of the atmosphere be confined to the particle-charging electrode of the electrostatic spray gun and not occur at other portions of the spray gun. To this end the outer portions of the electrostatic spray gun are of insulating material. Such a gun includes a metallic passage-forming member having a coating material inlet to which a hose fitting is attached. The metallic passage-forming member is fastened in and enclosed by a body of plastic material, such as Delrin, a trademark of E. I. du Pont for their acetal resin material. At the forward end of the gun, the passage-forming member has a surface forming a seal with a removable spray nozzle, and the outer plastic body has a threaded portion concentric with the passage in the metallic passage-forming member. A nylon carrier with a wire-like electrode and the spray nozzle is positioned against the seal forming surface of the passage-forming member, and held on the gun with a plastic retaining nut threaded onto the threaded portion of the plastic body. The metallic passage-forming member of the gun is connected with a source of high voltage by a high voltage cable and during operation is charged to a high voltage with respect to the article to be painted. The wire-like electrode contacts the passage-forming metallic body at the seal forming surface, is electrically charged, and creates a highly ionized zone forward of the orifice in the spray nozzle. The hose fittings by which the gun is connected to the high pressure pump become charged. If conventional high pressure hose fittings are used, the portions of the hose fittings which have sharp configurations create ionization of the atmosphere adjacent those portions.

It is an object of this invention to provide fittings whereby hoses carrying fluid at high pressure may be connected to an electrostatic spray gun and so that the outer surfaces of the hose fittings at the spray gun are of insulating material. A feature of this invention is that no electrically conductive members are exposed at the hose fitting when it is connected at its fitting receptacle. Another feature of this invention is that an inner metallic member provides a passageway for the high pressure material between the hose and the object to which the hose is connected. A further feature of this invention is that a resilient seal member seals the connection between the hose fitting and the fitting receptacle.

My invention will be fully understood from the following detailed description and the attached drawings in which.

Figure 1:
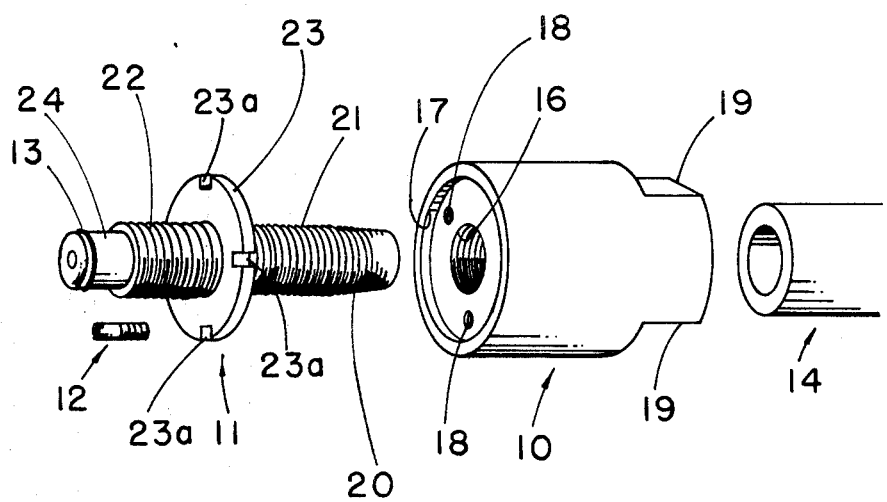
FIG. 1 is an exploded illustration of the hose fitting.

As shown in FIG. 1 my hose fitting includes an outer sleeve 10 of insulating material such as Delrin (a trademark of E. I. du Pont for their acetal resin), an inner metallic member 11, a screw 12, and a resilient seal 13. The outer sleeve 10 of insulating material has a bore through it on its axis. Upon assembly of the hose fitting a hose 14 is received in one end of the outer sleeve and the inner member 11 is fitted into the other end of the outer sleeve, which seats against the fitting receptacle. Assembly of the inner member 11 into the outer sleeve 10 with hose 14 in the hose-receiving end of the outer sleeve 10 seals hose 14 within the hose fitting against high pressure as will be described in greater detail.

Figure 2:
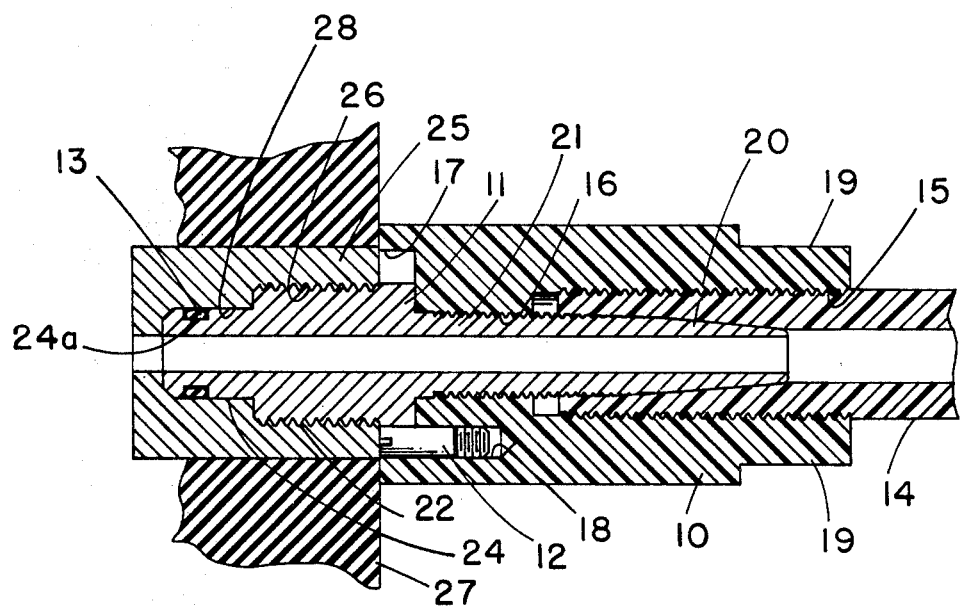
FIG. 2 is a cross-sectional view of a hose connection including the hose fitting of FIG. 1 and a fitting receptacle.

As shown in more detail in cross-sectional view of FIG. 2, the bore of the outer sleeve includes threaded serrations 15 at its hose-receiving end. Adjacent the seating end of the outer sleeve 10 is a section 16 of reduced cross-section which is threaded. At the seating end of the outer sleeve is a counterbore 17. The outer sleeve also includes threaded screw holes 18 (FIG. 1) inside counterbore 17. The axis of the screw holes lie parallel with the bore of the outer sleeve. Adjacent the hose-receiving end, the outer sleeve is machined to form two parallel flat surfaces 19 to permit the outer sleeve to be gripped by a tool such as a wrench.

The metallic inner member 11 is adapted to fit in the bore of outer sleeve 10 and forms a passageway for fluid material at high pressures. The first end of the inner metallic member 11 includes means adapted to engage the inside of hose 14, a tapered end portion 20 and a threaded shank 21. The threads on the threaded shank mate the threads in the reduced cross-section 16 of the bore adjacent the seating end. The second end of the inner member includes means defining a threaded connector 22 which has straight (non-expanding) threads and carrying a resilient seal 13. If threads are used to form the serrations in the hose-receiving end of sleeve 10, they should be the opposite of the threads on the connector portion 22 of the inner member 11, i.e. left-handed threads should be used as serrations if the connector portion of the inner member has right-handed threads. Adjacent the threaded connector is a flange 23 including a series of notches 23a. An unthreaded axial extension 24 of the threaded connector 22 includes an O-ring groove 24a and carries a resilient O-ring seal member 13. The axial extension 24 may have a reduced cross-section to reduce the fluid pressure force acting on the hose connector and tending to break the connection.

In assembling the hose into the hose fitting, the hose 14 is inserted into the hose-receiving end of outer sleeve 10. The threaded shank 21 of inner member 11 is threadedly inserted into the reduced cross-section 16 of the bore in outer sleeve 10. Upon insertion of the inner member 11 into the bore of outer member 10, the tapered end 20 of inner member 11 engages the inside of hose 14. As the inner member 11 is threaded into the outer sleeve 10, the tapered portion 20 and threaded shank 21 force the hose into the threaded serrations 15 in the hose-receiving end of the outer sleeve, sealing the hose and hose fitting against the high fluid pressure and retaining the hose within the hose fitting assembly. The inner member is threaded into the outer sleeve until flange 23 enters counterbore 17 and is thus enclosed by outer sleeve 10. The flange 23 of inner member 11 is notched as at 23a to provide tool-engaging surfaces so that a tool may be used to assist in threading of inner member into the outer sleeve during assembly. The notches, with a cooperating screw, prevent relative rotation of the inner member and outer sleeve. As shown in FIG. 1, the notches have a square shape; however, notches of any configuration may be used to provide the tool-engaging and screw-engaging surface. To fasten the inner member to the outer sleeve, thereby completing the assembly, one of the notches 23a is aligned with one of the screw holes 18 in the outer sleeve, and screw 12 is inserted through notch 23a and threaded into the screw hole 18, preventing the inner member and outer sleeve from rotating with respect to each other. Two screw holes 18 are provided in the outer sleeve 10 and four notches 23a are provided in the flange 23 of inner member 11. The screw holes 18 are located 135° apart and the notches 23a are located 90° apart so that the maximum rotational angle through which inner member 11 must be moved before screw 12 can be inserted is 22½°. The threaded connector 22 and the unthreaded axial extension 24 carrying O-ring 13 project from the outer sleeve. A tool such as a wrench fitted to the tool-engaging surfaces 19 of the outer sleeve may be used to grip the outer sleeve during assembly and disassembly of the hose fitting and, when the fitting is assembled, to rotate the hose and hose fitting assembly for connection with a fitting receptacle.

As shown in FIG. 2, a high pressure hose connection may be made by threading the threaded connector 21 into a fitting receptacle that may include a metallic member 25 forming a fluid passageway and having a female section 26 with straight threads to accept the threaded connector 22. Metallic member 25 may be the coating material inlet of the metallic passage-forming member of an electrostatic spray gun, or may be part of a hose coupling. Upon assembly of the hose fitting to the fitting receptacle, the resilient seal 13 is supported between the threaded connector 22 of the hose fitting and the fitting receptacle, thereby sealing the connection against the pressure of the fluid passing through it. If the fitting receptacle includes a metallic member, it may include an outer member 27 of insulating material to which the metallic member 25 is fastened. The fitting receptacle should include a smooth surface to provide a seal with the resilient seal member, for example metallic member 25 of the fitting receptacle includes a smooth bore 28 of reduced diameter against which the O-ring 13 seats.

Fittings made in accordance with my invention may be used with pressures up to 2500 p.s.i. and an electrostatic spray gun having a metallic member charged to 100,000 volts. Such fittings have withstood pressures of 5000 p.s.i. in tests. The fitting may be easily disassembled from the hose and reused in the event of a hose failure.

The invention and its features are characterized in the preceding description and it is defined in the claims which follow.

I claim:

1. A connection for a hose carrying fluid under high hydraulic pressures, comprising: a hose fitting including an outer sleeve of electrically nonconductive material having a hose-receiving end, a seating end and a bore therebetween having serrations adjacent said hose-receiving end, an inner member defining a passageway for fluid under high pressure and adapted to fit in said sleeve bore, said inner member having first end means adapted to engage a hose and second end means defining a threaded connector having straight threads, said outer sleeve and said inner member being arranged so that upon assembly said first end means forces the hose into said sleeve serrations and said second end means projects from said seating end of said sleeve, and means for fastening said inner member to the outer sleeve; a fitting receptacle defining a further passageway for fluid under high pressure and having straight threads to accept the threaded connector of the hose fitting and to join the passageways; and a resilient seal supported between the threaded connector of the hose fitting and fitting receptacle and located between the junction of the passageways and the straight threads of the connector to seal the hose connection upon assembly of the hose fitting to the fitting receptacle.

2. A hose connection as set forth in claim 1 wherein said second end means of the inner member of the hose fitting includes an axial extension having a smaller cross-sectional area than the threaded connector and defining a groove and said resilient seal member is an O-ring in the groove, and said fitting receptacle includes a smooth bore to form a seal with the O-ring upon assembly of said hose fitting and said fitting receptacle.

3. A hose fitting for use with a hose carrying fluid under high pressure, comprising: an outer sleeve of electrically non-conductive material having a hose receiving end, a seating end and a bore therebetween, the bore having serrations adjacent the hose receiving end and a counterbore at the seating end; an inner metallic member defining a passageway for fluid under pressure and adapted to fit in the sleeve bore, the inner member having first end means adapted to engage a hose, second end means defining a threaded connector having straight threads and carrying a resilient seal, and a flange adjacent the threaded conductor; means for fastening said inner member to said outer sleeve and means within the counterbore of the outer sleeve engaging the flange and the outer sleeve to prevent relative rotation of the inner member and the outer sleeve when assembled, the inner member and the outer sleeve being assembled so that the first end means forces a hose into the sleeve serrations, the flange enters the counterbore and is enclosed by the outer sleeve, and the second end means projects from the sleeve seating end.

4. A hose fitting as set forth in claim 3, wherein said outer sleeve includes a threaded hole parallel to the bore inside the counterbore, said flange of said inner member has notches, and said means within the counterbore to prevent relative rotation of the inner member and the outer sleeve includes a screw in the threaded hole of the outer sleeve and engaging a notch of the flange.

5. A hose fitting as set forth in claim 4 wherein said inner member includes a threaded shank, and said bore includes a section of reduced cross-section between said serrations and said seating end, said section of reduced cross-section being threaded to mate said threaded shank, said notches including tool-engaging surfaces to assist threading said inner member into said outer sleeve upon assembly.

6. A hose fitting as set forth in claim 3 wherein said threaded connector carrying the resilient seal includes an axial extension having a groove and said resilient seal member is an O-ring in the groove.

7. A hose fitting as set forth in claim 6 wherein said axial extension has a cross-section smaller than the cross-section of the threaded connector.

8. A hose fitting for use with a hose carrying fluid under high pressure, comprising: an outer sleeve of electrically non-conductive material having a hose-receiving end, a seating end and a bore therebetween, the bore having threaded serrations adjacent the hose-receiving end and a threaded section of reduced cross section between the threaded serrations and the seating end; an inner metallic member defining a passageway for fluid under pressure and adapted to fit in the sleeve bore, the inner member having first end means including a threaded shank and a tapered end portion adapted to engage the hose and second end means defining a threaded connector having straight threads and carrying a resilient seal, the threaded shank of the inner member being threaded to mate the threaded reduced cross-section of the bore and threadedly inserted therein upon assembly so that a hose can be compressed between the threaded serrations of the outer sleeve and the threaded shank of the inner sleeve and the second end means of the inner member projects from the sleeve seating end; and means for fastening the inner member to the outer sleeve including a screw engaging a portion of the surface of the inner member and threaded into the outer sleeve to prevent the outer sleeve and inner member from rotating with respect to each other, said outer sleeve having a tool-engaging surface.

9. A hose fitting as set forth in claim 8 wherein the inner member includes a flange adjacent the second end means, the flange being received in a counterbore in the outer sleeve adjacent the seating end and enclosed by the outer sleeve, the flange including a tool-engaging surface to assist threading the inner member into the outer sleeve and to provide the surface of the inner member to engage said means and prevent relative rotation of the outer sleeve and inner member.

References Cited

UNITED STATES PATENTS

| | | | |
|---|---|---|---|
| 2,204,586 | 6/1940 | Graw | 285—175 X |
| 2,360,761 | 10/1944 | Clickner | 285—251 |
| 2,468,338 | 4/1949 | MacWilliam | 295—251 |
| 2,487,554 | 11/1949 | Hurst | 285—47 |
| 2,518,426 | 8/1950 | Kinander | 285—39 X |
| 2,540,113 | 2/1951 | Hartley et al. | 285—245 |
| 2,553,342 | 5/1951 | Trageser | 285—39 X |
| 2,764,430 | 9/1956 | Roberts | 285—245 |
| 2,785,911 | 3/1957 | Kaufman | 285—52 |
| 3,088,757 | 5/1963 | McIntosh | 285—192 X |
| 3,240,513 | 3/1966 | Turzillo | 285—90 |

FOREIGN PATENTS

| | | |
|---|---|---|
| 1,030,697 | 5/1966 | Great Britain. |

DAVE W. AROLA, Primary Examiner

U.S. Cl. X.R.

285—47, 90, 158, 245, 347